(12) United States Patent
Moletti et al.

(10) Patent No.: US 8,848,029 B2
(45) Date of Patent: Sep. 30, 2014

(54) OPTIMIZING ROOM LIGHTING BASED ON IMAGE SENSOR FEEDBACK

(75) Inventors: Naresh Moletti, Redmond, WA (US); Nghiep Duong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 13/117,946

(22) Filed: May 27, 2011

(65) Prior Publication Data

US 2012/0300011 A1 Nov. 29, 2012

(51) Int. Cl.
*H04N 7/14* (2006.01)
*G06K 9/00* (2006.01)
*H05B 37/02* (2006.01)
*H04N 7/15* (2006.01)

(52) U.S. Cl.
CPC .............. *H05B 37/0227* (2013.01); *H04N 7/15* (2013.01)
USPC .................... 348/14.12; 348/14.08; 348/14.1; 382/100; 382/103

(58) Field of Classification Search
CPC ......... H04N 7/14; H04N 7/141; H04N 7/142; H04N 7/144; H04N 7/147; H04N 7/148; H04N 7/15; H04N 7/152; H04N 7/155; H04N 7/157; H04N 5/7416; H04N 2005/7416; H05B 7/0227
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| | | | |
|---|---|---|---|
| 7,355,523 B2 | 4/2008 | Sid | |
| 7,697,031 B2 | 4/2010 | Knoedgen et al. | |
| 2005/0073575 A1* | 4/2005 | Thacher et al. | 348/14.13 |
| 2006/0077193 A1 | 4/2006 | Thielemans et al. | |
| 2006/0098099 A1 | 5/2006 | Koide | |
| 2009/0051756 A1* | 2/2009 | Trachtenberg et al. | 348/14.08 |
| 2009/0262189 A1 | 10/2009 | Marman | |
| 2010/0256823 A1 | 10/2010 | Cherukuri et al. | |
| 2010/0259931 A1 | 10/2010 | Chemel et al. | |
| 2011/0090311 A1* | 4/2011 | Fang et al. | 348/43 |
| 2012/0057755 A1* | 3/2012 | Berkvens | 382/103 |
| 2012/0120184 A1* | 5/2012 | Fornell et al. | 348/14.12 |
| 2012/0200660 A1* | 8/2012 | Verthein et al. | 348/14.08 |
| 2012/0313588 A1* | 12/2012 | Carberry et al. | 320/134 |

FOREIGN PATENT DOCUMENTS

WO    WO 2010131212 A1 * 11/2010

OTHER PUBLICATIONS

"The Value of Wireless Lighting Control", Retrieved at<<http://www.daintree.net/downloads/whitepapers/smart-lighting.pdf>>, Aug. 2010, pp. 6.

(Continued)

*Primary Examiner* — Khai N Nguyen
(74) *Attorney, Agent, or Firm* — Andrew Smith; Jim Ross; Micky Minhas (57) ABSTRACT

A mechanism for efficiently and dynamically adjusting lighting conditions in a space through the use of existing video capture devices in the space or video capture devices on computing devices brought into the space is provided. Incident lighting levels, light composition, and similar aspects on the participants, displays, projectors, white boards, walls, and comparable objects may be calibrated and/or optimized based on captured image quality.

20 Claims, 7 Drawing Sheets

(56) References Cited

OTHER PUBLICATIONS

Newsham, et al., "A Camera as a sensor for lighting and shading control", Retrieved at<<http://www.nrc-cnrc.gc.ca/obj/irc/doc/pubs/nrcc50453.pdf>>, Jun. 2009, pp. 26.

Miki, et al, "Intelligent Lighting System using Visible-Light Communication Technology", Retrieved at<<http://ieeexplore.ieee.org/xpl/freeabs_all.jsp?arnumber=4017816>>, Dec. 4, 2006, pp. 6.

* cited by examiner

OPTIMIZING ROOM LIGHTING BASED ON IMAGE SENSOR FEEDBACK

BACKGROUND

Physical and virtual meetings commonly converge in places such as conference rooms, where one or more people may confer with others through networked communications, frequently establishing video communications or similar modalities. Video communications and recording also takes place in other places such as auditoriums, meeting halls, even private offices. In such environments, lighting becomes an important aspect of user experience especially for participants who have to view a video recording (live or after the fact) of a meeting, presentation, etc.

Modern lighting systems allow different levels and forms of lighting (e.g., incandescent, fluorescent, etc.) usually through manual adjustment. Manual adjustment can be cumbersome. Furthermore, conditions within a room may change during a session. For example, a video conference may begin with the focus being on a presentation at a white board, but continue later with a conversation between people around a table. In such scenarios, people usually do not adjust the lighting based on the changing circumstances potentially leading to reduced video quality in the recording.

Proper illumination on the participants and the objects of interest is key for a video camera to capture and render a faithful image on the receiver end. Even with adjustable lighting levels, the lighting systems are typically installed based on the room structure and are not dynamically alterable based on a quality of image at the receiving end. For example, lighting adjustment levels set up for a white board section of a room may not provide optimum reflection or illumination for a computer monitor in the same section.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a mechanism for efficiently and dynamically adjusting lighting conditions in a space through the use of existing video capture devices in the space or video capture devices on computing devices brought into the space. Incident lighting levels, light composition, and similar aspects on the participants, displays, projectors, white boards, walls, and comparable objects may be calibrated and/or optimized based on captured image quality.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, lighting conditions in a room may be adjusted efficiently and dynamically utilizing existing video/image capture devices in the space or video/image capture devices on computing devices brought into the space. Incident lighting levels, light composition, and similar aspects on the participants, displays, projectors, white boards, walls, and comparable objects may be calibrated and/or optimized based on captured image quality. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for controlling lighting conditions. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
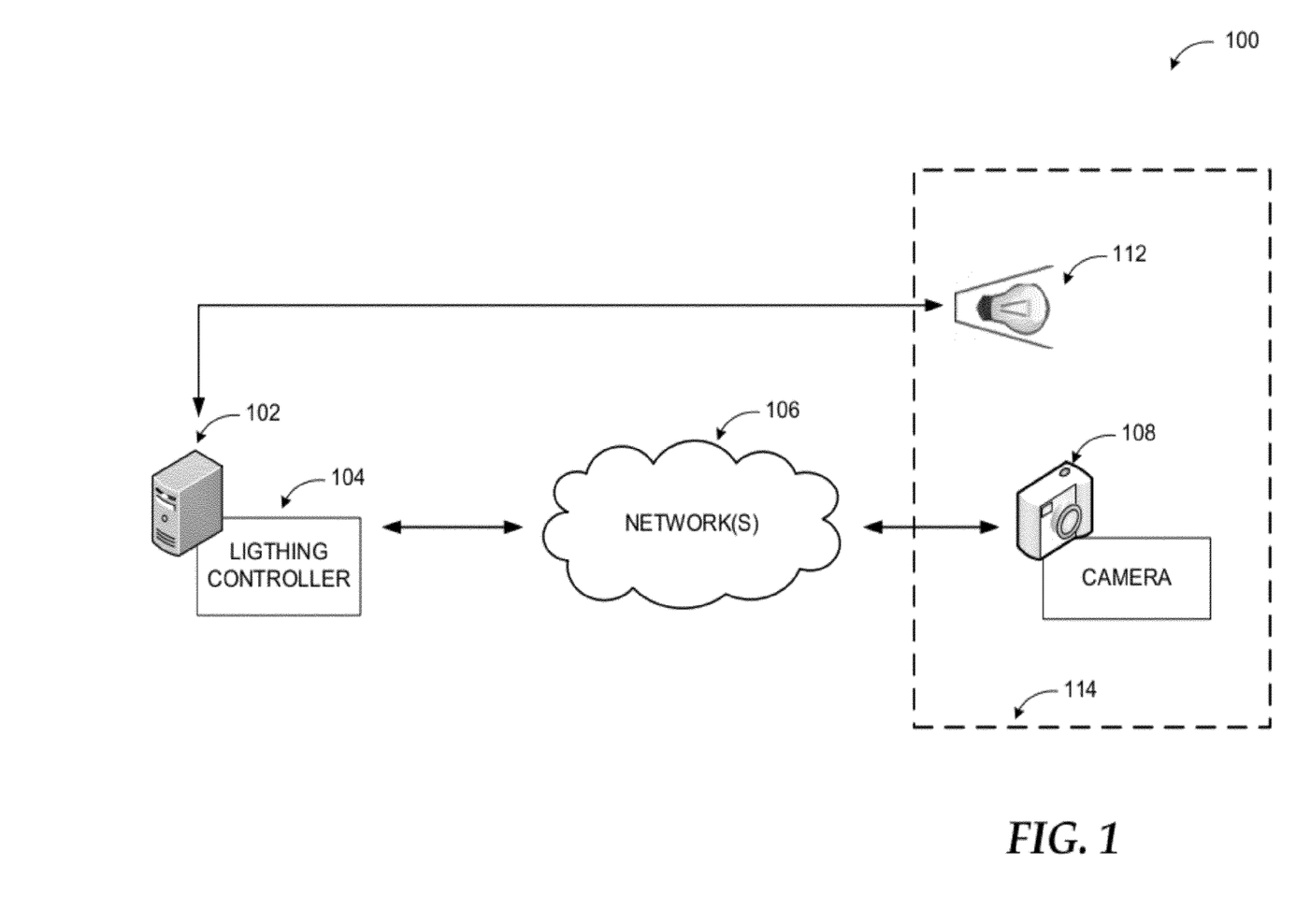
FIG. 1 illustrates an example networked lighting control system according to some embodiments.

FIG. 1 illustrates an example networked lighting control system according to some embodiments. In locations where video recording may take place such as conference rooms, auditoriums, and similar places adverse components of lighting (for example, too high or too low light levels, glare, incorrect color spectrum, etc.) may result in degraded image quality in the captured video whether it is for subsequent viewing or for real time communication.

To address potential lighting problems such as shadowing, color spectrum skewing, glare, and similar ones, different aspects of lighting in a room may need to be adjusted. For example, light levels may be adjusted for incandescent light sources through electrical means, while light levels for fluorescent light sources may need to be adjusted through mechanical means (e.g., use of shutters, rotation of light source, etc.). In addition, different light sources may be combined or excluded to achieve a desired color spectrum.

Luminance, Unified Glare Rating (UGR), Visual Comfort Probability, and Daylight Glare Index are some of the commonly used measurement methods for setting lighting parameters. However, most of these measurements require either specialized equipment (e.g., dosimeter) or special calibration sessions making it at least impractical to adjust lighting conditions in a room dynamically based on changing circumstances such as the focus of a video conference changing from a white board to a person, a number of people (or their location) changing during an ongoing video conference, etc.

In a system according to embodiments, such as the one shown in diagram 100, image capture devices (e.g., a video camera 108) already installed in a room 114 may be employed as an input device to control, optimize, and calibrate the lighting in the room 114 eliminating the need for photo sensors and other discrete lighting detectors. Virtual lighting detection techniques (like image processing or other software controlled means) based on a captured image may be utilized to optimize the lighting in the room. One or more lighting control applications 104 executed on a dedicated or general purpose computing device 102 may determine appropriate lighting parameters (levels, composition, positioning of lighting source(s) 112, etc.) and configure the lighting sources 112. The input (captured images) may be provided by camera 108 to the computing device 102 through one or more network(s) 106. Thus, the lighting control application(s) 104 may be executed on an in-room computing device or on a remote computing device (e.g., a central controller for a plurality of conference rooms in a building). Because the lighting parameters are controlled based on captured images and specialized equipment or configuration are not required, the adjustment to the lighting parameters may be made dynamically as circumstances in the room 114 change.

Figure 2:
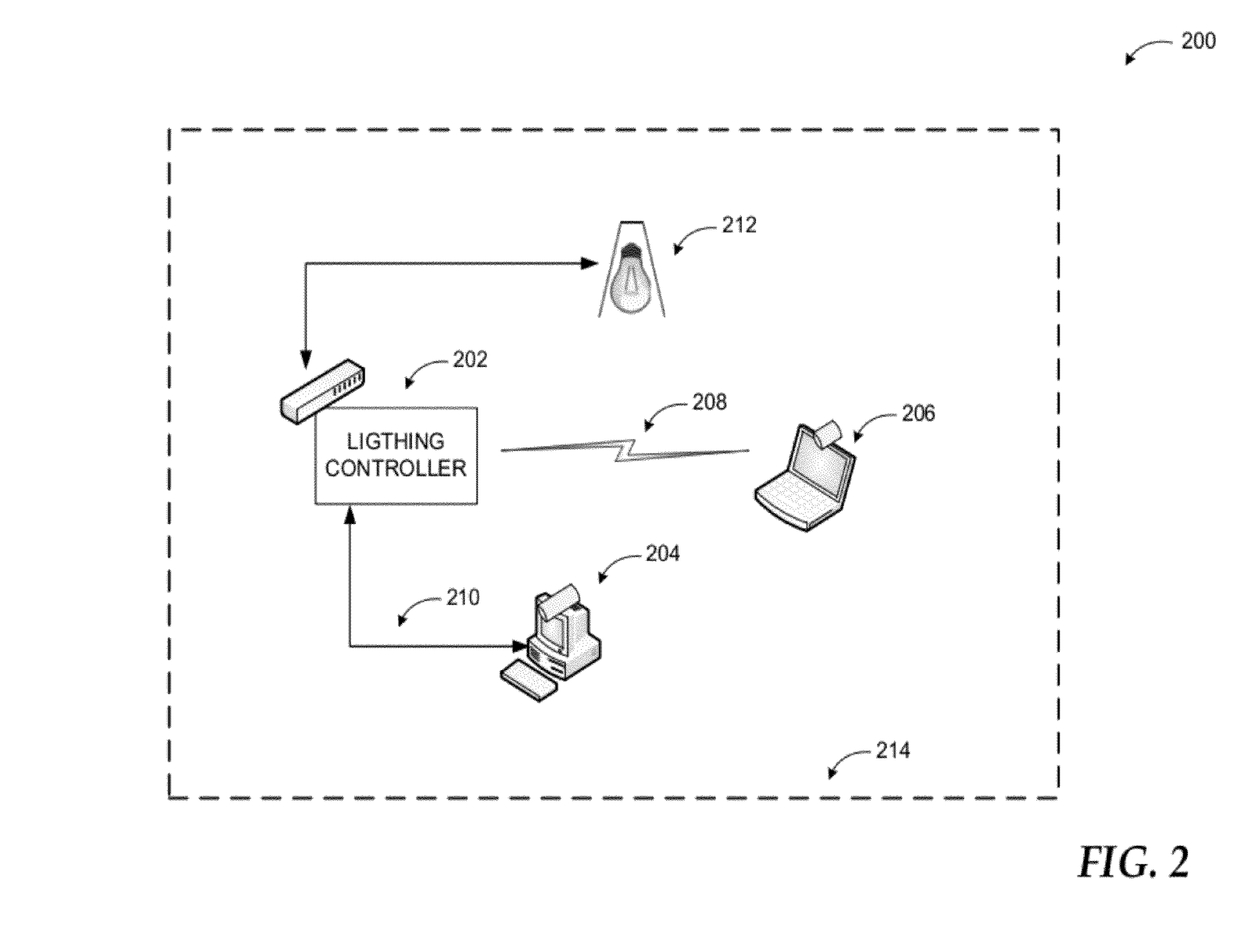
FIG. 2 illustrates another example lighting system that utilizes image capture devices existing in a room or brought into the room for adjusting lighting conditions.

FIG. 2 illustrates another example lighting system that utilizes image capture devices existing in a room or brought into the room for adjusting lighting conditions. In diagram 200, lighting source 212 represents a plurality of lighting sources, which may include various light fixtures with different features. For example, some light fixtures may include incandescent bulbs, others may be fluorescent, while yet others may include Light Emitting Diode (LED) light sources. Different light fixtures may include light sources (bulbs) of different colors to combine them for a desired color spectrum. Furthermore, some fixtures may be rotatable while others may be fixed.

To illustrate the diversity of a lighting control system according to embodiments, the configuration in diagram 200 includes an in-room specialized lighting controller 202 managing lighting sources 212 in room 214. Lighting controller 212 may receive input (in form of raw images, processed images, or lighting parameters based on processed images) from stationary or portable devices with image capture capability such as desktop computer 204 and laptop computer 206. The communication between the input sources and the lighting controller 212 may be through wired means 210 or wireless means 208 (e.g., optical or radio frequency waves).

As mentioned above, lighting controller 212 may receive different types of input depending on its complexity. For example, lighting controller 212 may be a full-capability controller and perform image processing, lighting parameter computation, and control of lighting sources all in one device (or a combination of hardware/software modules). In other embodiments, some of the functionality may be shared with other devices. For example, a separate switch controller may perform actual adjustment of lighting sources, a separate image processing module may process received images, etc. Yet, in further embodiments, lighting controller 212 may act as an interface for application(s) executed on individual computing devices (e.g., 204 and 206) to process captured images and send control commands to lighting sources 212.

Moreover, input from a plurality of image capture devices (e.g., in-room camera, a laptop camera, a handheld device camera, etc.) may be combined in a weighted or selective manner to optimize captured image quality for one or more devices in the room. For example, if one camera is being used to facilitate a video camera, the lighting conditions may be adjusted based on input for that camera. On the other hand, if multiple devices are recording a presentation, input from such devices may be combined in a weighted manner such that the average captured video quality for all devices is enhanced.

Figure 3:
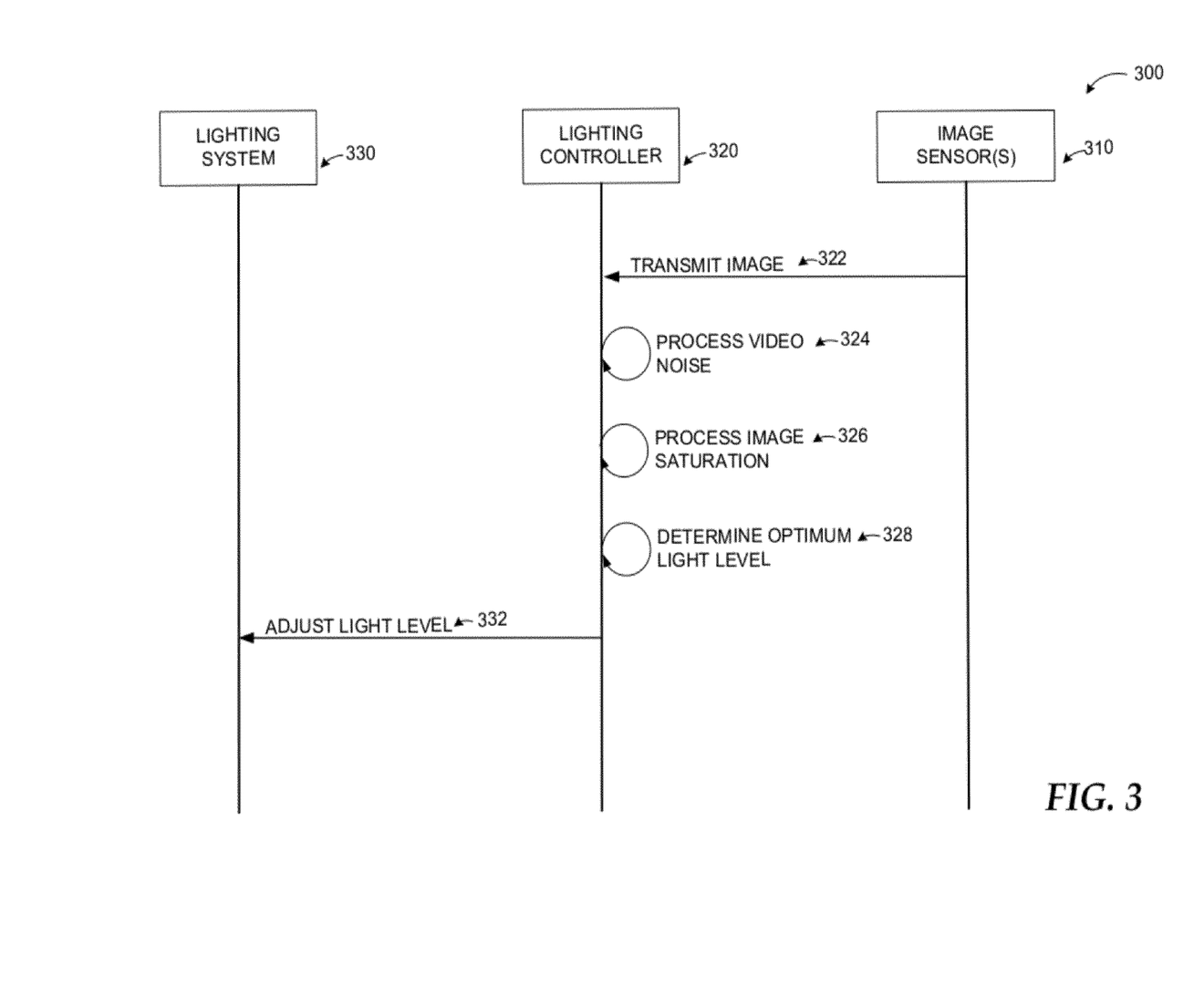
FIG. 3 is an action diagram illustrating interactions within major components of a lighting control system according to some embodiments.

FIG. 3 includes action diagram 300 illustrating interactions within major components of a lighting control system according to some embodiments. In a typical example scenario, image sensors 310 (e.g., video cameras installed in a conference room or on computers in the conference room) may periodically or on-demand capture images and transmit (322) to lighting controller 320.

Lighting controller 320 may process the images for various quality aspects such as video noise (324), image saturation (326), or comparable ones and determine optimum light conditions 328 (e.g., lighting level in a simple setup). Lighting controller 320 may then adjust the determined lighting parameters (332) such as the lighting levels by instructing lighting system 330 through appropriate interfaces.

Figure 4:
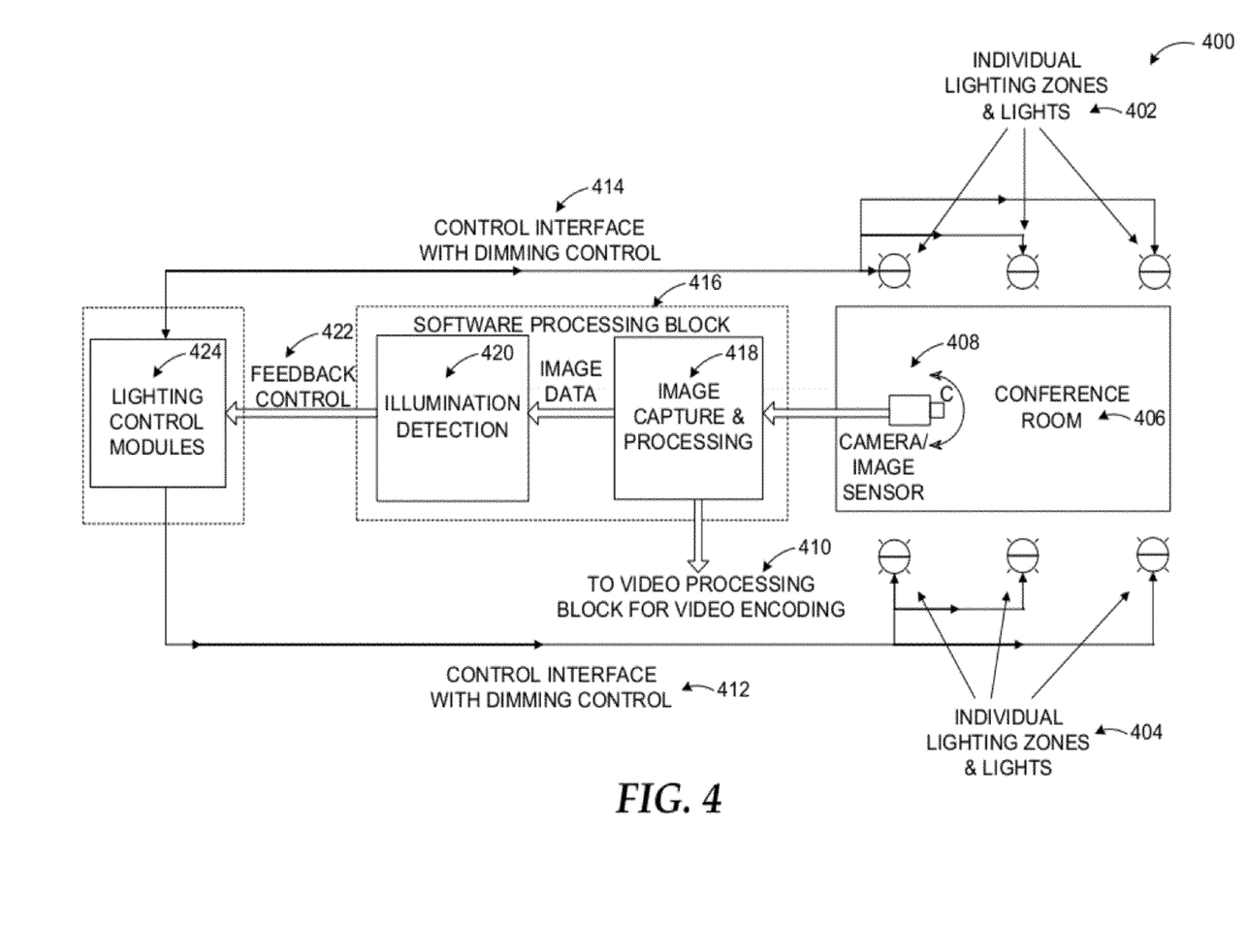
FIG. 4 illustrates major components of an example lighting control system according to some embodiments.

FIG. 4 illustrates major components of an example lighting control system according to some embodiments. As shown in diagram 400, a conference room 406 may be equipped with different lighting zones and lights 402, 404. Lighting control modules 424 may adjust different parameters of the lights through respective control interfaces (with dimming control, for example) 414, 412. A camera 408 in conference room 406 may be used as image sensor providing captured images to software processing block 416, which may include an image capture and processing block 418. Image capture and processing block 418 may provide image data to illumination detection block 420 as well as to a video processing block for video encoding 410 (for video communication or recording). Illumination detection block 420 may determine proper lighting parameters (e.g., level, composition, light fixture angles, etc.) and provide feedback 422 to lighting control modules 424.

Image sensors in camera 408 comprise a set of pixel sensors outputting an absolute value of the amount of incident light on the sensor. These signals may be software processed and an illuminance value for the incident lighting on an object or area of interest may be determined. This value may then be used as a feedback mechanism to the existing lighting control system within the room as discussed above. In a lighting control system capable of separating the various lighting elements into individual controllable groups or zones like the one shown in diagram 400, corresponding zones may be adjusted to optimize the lighting for a section of the room while keeping the other lighting zones intact. Camera 408 may have a PTZ (Pan, Tilt, Zoom) feature, which enables the camera to focus onto selective areas and estimate the illuminance value in that zone or area of conference room 406.

While many aspects of lighting may be controlled based on various aspects of captured image quality, two example ones are discussed herein. If the captured image has insufficient lighting incident on the participants or object of interest, the lack of light manifests itself as a dark picture with video noise. The lighting controller may be configured to detect the video noise by looking at the average incident light level of pixels across the image and facilitate an increase in the amount of lighting in the room in a control feedback mechanism. This prevents the camera from adjusting its optical characteristics to adapt to the sub-optimal lighting and provides a better signal-to-noise ratio for the electrical video signal.

Another image quality aspect that may be used in a system according to embodiments is image saturation. If the captured image has too much lighting incident on the participants or objects of interest, the overload may cause image saturation or burn-out with dark areas appearing completely black and/or bright areas with lost detail. Similar to the video noise example above, the lighting controller may detect this by analyzing the average incident light level of pixels across the image and reduce the amount of lighting in the room in a control feedback mechanism until optimal point is achieved.

Video conferencing cameras commonly employ CMOS image sensors rather than Charge Coupled Devices (CCDs). These sensors sense light by taking advantage of the photoelectric effect. Each pixel within the sensor is composed of a photodiode, which is a key element of a digital image sensor. Thus, a CMOS sensor may be viewed as a cluster of photodiodes (pixels), which detect the incident luminance on the sensor. The amount of incident light cannot be directly characterized as lumens, however, as the incident photons on the photodiode go through filter arrays before being converted into voltage for digital conversion. Software algorithms may be applied though to reconvert the incident luminance back to lumens.

Room lighting conditions between different conference rooms may vary significantly. Because an absolute value of the room lighting cannot be extracted by software, a baseline of the room lighting settings for various zones with maximum, minimum, and optimal light settings may be captured at a predefined time and a look-up-table may be created. The look-up-table may be used to control the lighting during a video conference, for example. If the lighting in the room is within the range of acceptable level (e.g., between minimum and maximum level of the look-up table) for good performance of a camera, no lighting control may be initiated by controller. However, when the lighting controller detects that the lighting is out the maximum and minimum range settings, it may initiate a feedback control loop to the lighting control system until the software sees the lighting is the optimal range. This may be performed at the start of a video conference and at discrete intervals, and may be overridden by a manual override if not desired.

The example systems in FIG. 1 through 4 are shown with specific components, exchanges, and configurations. Embodiments are not limited to systems according to these example configurations. Optimizing room lighting based on image sensor feedback may be implemented in configurations employing fewer or additional components in applications and user interfaces.

Figure 5:
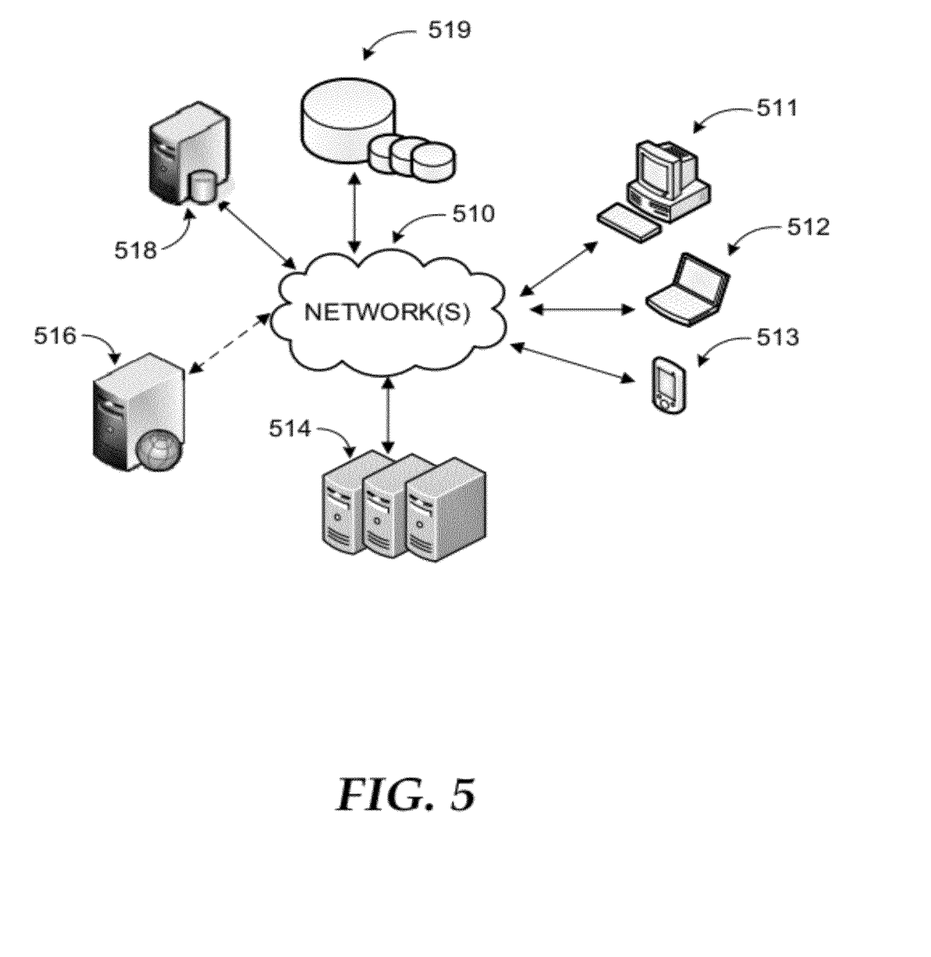
FIG. 5 is a networked environment, where a system according to embodiments may be implemented.

FIG. 5 is a networked environment, where a system according to embodiments may be implemented. A system optimizing room lighting based on image sensor feedback may include one or more applications executed over one or more servers 514 or a single server 516 such as a hosted service. The control application(s) may communicate with image sensors installed in conference rooms and similar locations, as well as computing devices that are (or brought into) such rooms with integrated image capture devices. Client applications on individual computing devices such as a smart phone 513, a laptop computer 512, or desktop computer 511 ('client devices') may enable access to captured images through network(s) 510.

As discussed above, lighting conditions such as levels, spectral composition, locations, angles, etc. may be adjusted efficiently and dynamically utilizing existing video/image capture devices in the space or video/image capture devices on computing devices brought into the space. One or more aspects of lighting may be calibrated and/or optimized based on captured image quality at a controller and the lighting elements set accordingly. Images for determining lighting conditions may be captured through installed image capture devices such as conference room video cameras or through image capture devices on computers brought into a room (e.g., client devices 511-513). The controller may be a specialized device in the room, a computer in the room, or a remote control device communicatively coupled to the image sensors in the room (e.g., servers 514 or server 516). The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to optimize lighting conditions based on image sensor feedback. Furthermore, the networked environments discussed in FIG. 5 are for illustration purposes only. Embodiments are not limited to the example applications, modules, or processes.

Figure 6:
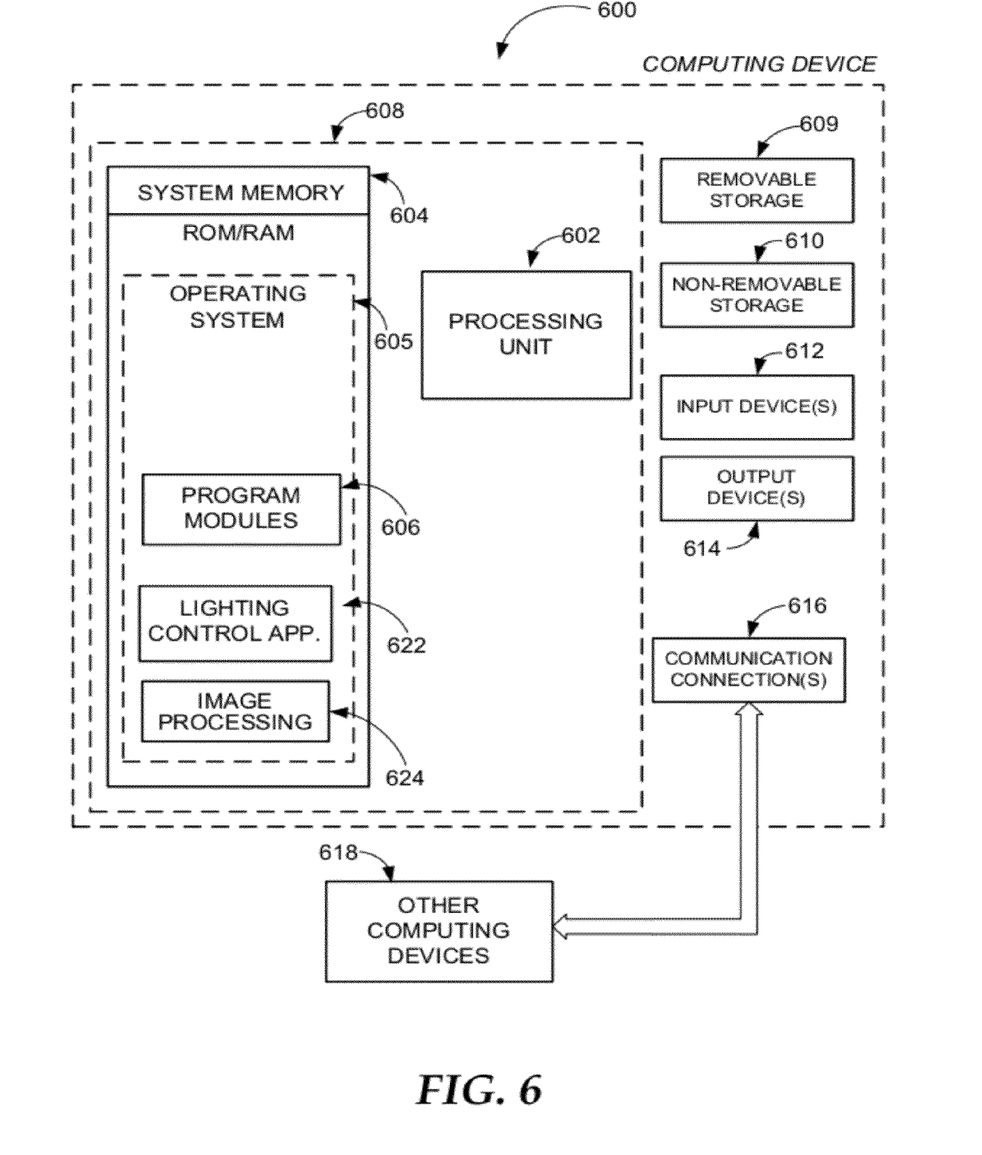
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, lighting control application 622, and image processing module 624.

Lighting control application 622 and image processing module 624 may be distinct applications or integrated modules of a control service. Lighting control application 622 may manage a plurality of light controls such as levels, motorized lighting fixture adjusters, and so on. Image processing module 624 may receive captured images from image sensors in a room, analyze image quality such as image saturation or video noise, and provide feedback to lighting control application 622 such that lighting conditions can be adjusted for optimum image quality as discussed above. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
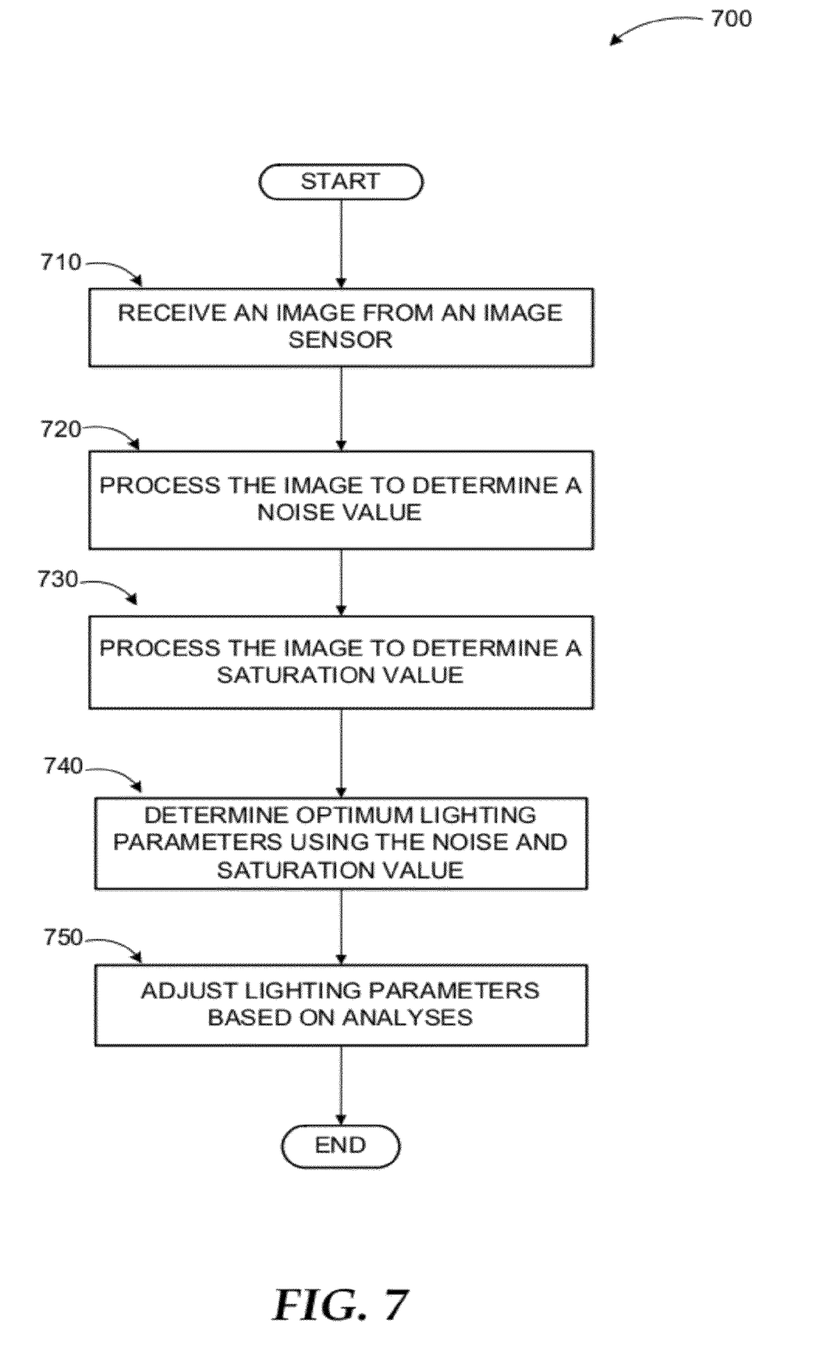
FIG. 7 illustrates a logic flow diagram of a process for adjusting lighting conditions based on image capture according to embodiments.

FIG. 7 illustrates a logic flow diagram of example process 700 for adjusting lighting conditions based on image capture according to embodiments. Process 700 may be implemented by a local controller device or a networked lighting control service.

Process 700 may begin with operation 710, where a captured image is received from an image sensor such as a video camera installed in a room or integrated into a computing device being used in the room. At operations 720 and 730, different aspects of the image such as video noise value and image saturation value may be analyzed. In other embodiments, additional aspects such as shadowing may also be computed.

At operation 740, an optimum lighting condition including, but not limited to, a light level, a light composition, a lighting angle, etc. may be determined based on results of the analyses in operations 720 and 730 (and additional ones if applicable). At operation 750, lighting parameters may be adjusted based on the determination at operation 740.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Adjusting lighting conditions based on captured image quality may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for optimizing room lighting based on image sensor feedback, the method comprising:
   a processor receiving an image captured by an image sensor within a predefined space;
   the processor capturing a baseline of lighting settings of the predefined space for at least one zone with maximum, minimum, and optimal light settings;
   the processor creating a look-up-table at a predefined time of the baseline;
   the processor analyzing the captured image to determine at least one quality aspect of the image;
   the processor determining a lighting parameter to enhance the at least one quality aspect of the image; and
   the processor adjusting a lighting condition for the predefined space based on the lighting parameter by causing an adjustment of one or more lighting sources.

2. The method of claim 1, further comprising:
   the processor determining a video noise level of the captured image as the quality aspect.

3. The method of claim 1, further comprising:
   the processor determining an image saturation level of the captured image as the quality aspect.

4. The method of claim 1, wherein the lighting condition includes at least one from a set of: a light level, a light color composition, a light source angle, and a light source type.

5. The method of claim 1, further comprising:
   performing a calibration comprising analysis of a captured image, determination of a lighting parameter, and adjustment of a lighting condition prior to a video communication session performed in the predefined space.

6. The method of claim 5, further comprising:
   the processor repeating the analysis of a captured image, the determination of a lighting parameter, and the adjustment of a lighting condition dynamically in response to a change of area of interest during the video communication session.

7. The method of claim 6, further comprising:
   the processor repeating the analysis of a captured image, the determination of a lighting parameter, and the adjustment of a lighting condition periodically during the video communication session.

8. The method of claim 1, wherein the image sensor is a camera with pan, tilt, zoom (PTZ) capability installed in the predefined space, and the method further comprises:
   the processor repeating the analysis of a captured image, the determination of a lighting parameter, and the adjustment of a lighting condition in response to a change in at least one PTZ parameter of the camera during the video communication session.

9. The method of claim 8, wherein the predefined space includes a plurality of lighting zones, and the method further comprises:
   the processor repeating the analysis of a captured image, the determination of a lighting parameter, and the adjustment of a lighting condition for each of the lighting zones by adjusting the camera's PTZ parameters.

10. The method of claim 1, wherein the image sensor is a camera associated with a portable computing device in the predefined space and transmitted to a lighting controller.

11. A lighting controller for optimizing room lighting based on image sensor feedback, the lighting controller comprising:
    a memory storing instructions; and
    a processor coupled to the memory, the processor executing an image processing module and a lighting control module in conjunction with the instructions stored in the memory, wherein the image processing module is configured to:
        receive an image captured within the room;
        analyze the captured image to determine at least one quality aspect of the image, wherein the at least one quality aspect is a video noise level detected by looking at an average incident light level of pixels across the image and facilitating an increase in an amount of lighting in the room in a control feedback mechanism; and
    the lighting control module is configured to:
        determine a lighting parameter to enhance the at least one quality aspect of the image; and
        adjust a lighting condition comprising at least one from a set of: a light level, a light color composition, a light source angle, and a light source type for the room based on the lighting parameter.

12. The lighting controller of claim 11, wherein the image is captured by at least one from a set of: an in-room camera, an image capture device attached to a stationary computing device in the room, and an image capture device attached to a portable computing device in the room.

13. The lighting controller of claim 12, wherein the image processing module is further configured to:
    determine quality aspects of a plurality of images from a plurality of input devices; and
    the lighting control module is further configured to:
    determine the lighting parameter based on one of a weighted combination and a selective combination of the quality aspects.

14. The lighting controller of claim 11, wherein the room includes a plurality of lighting zones, and the lighting control module is further configured to adjust lighting conditions for each of the lighting zones.

15. The lighting controller of claim 11, wherein the lighting control module is further configured to:
    generate a look-up table of acceptable lighting parameter ranges based on a calibration process comprising analysis of a captured image, determination of a lighting parameter, and adjustment of a lighting condition; and
    repeat the analysis of a captured image, the determination of a lighting parameter, and the adjustment of a lighting condition if a lighting parameter is detected to be out of range.

16. The lighting controller of claim 11, wherein the lighting controller is one of a special purpose device, a server executing a lighting control application, and a general purpose computing device executing the lighting control application.

17. A method executed on a computing device for optimizing room lighting based on image sensor feedback, the method comprising:
    a processor receiving an image captured within a room;
    the processor capturing a baseline of lighting settings of the room for at least one zone with maximum, minimum, and optimal light settings;
    the processor creating a look-up-table at a predefined time of the baseline;

the processor analyzing the captured image to determine at least one of a video noise level and an image saturation level of the image, wherein the video noise level is detected by looking at an average incident light level of pixels across the image and facilitating an increase in an amount of lighting in the room in a control feedback mechanism;

the processor determining a lighting parameter to enhance the at least one of the video noise level and the image saturation level of the image; and the processor adjusting a lighting condition by causing an adjustment of the one or more lighting sources, the lighting condition comprising at least one from a set of: a light level, a light color composition, a light source angle, and a light source type for the room based on the lighting parameter.

18. The method of claim 17, wherein the image is captured and processed by at least one image capture device within the room and a result of the analysis transmitted to a lighting controller through one of a wired and a wireless means for determination of the lighting parameter.

19. The method of claim 17, wherein the image is captured and processed, and the lighting parameter determined by at least one computing device with an image capture device within the room, and the lighting parameter transmitted to a lighting controller acting as interface for light sources within the room.

20. The method of claim 17, further comprising:

the processor dynamically adjusting the lighting condition during a video communication session in response to changes in the room.

\* \* \* \* \*